US012773626B2

(12) United States Patent
Zhang et al.

(10) Patent No.: US 12,773,626 B2
(45) Date of Patent: Oct. 27, 2026

(54) AI MIDDLEWARE THAT MONITORS COMMUNICATION TO FILTER AND MODIFY LANGUAGE BEING RECEIVED AND TO SUMMARIZE DIALOGUE BETWEEN FRIENDS THAT A PLAYER MISSED WHILE STEPPING AWAY

(71) Applicant: Sony Interactive Entertainment Inc., Tokyo (JP)

(72) Inventors: Jin Zhang, San Mateo, CA (US); Mahdi Azmandian, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 347 days.

(21) Appl. No.: 18/500,723

(22) Filed: Nov. 2, 2023

(65) Prior Publication Data

US 2025/0144517 A1 May 8, 2025

(51) Int. Cl.
*A63F 13/497* (2014.01)
*A63F 13/533* (2014.01)
*A63F 13/87* (2014.01)
*G06F 40/279* (2020.01)
*A63F 13/86* (2014.01)

(52) U.S. Cl.
CPC .......... *A63F 13/497* (2014.09); *A63F 13/533* (2014.09); *A63F 13/87* (2014.09); *G06F 40/279* (2020.01); *A63F 13/86* (2014.09); *G06T 2200/24* (2013.01)

(58) Field of Classification Search
CPC ...... A63F 13/497; A63F 13/533; A63F 13/87; A63F 13/86; A63F 13/493; A63F 13/54; G06F 40/279; G06T 2200/24
See application file for complete search history.

(56) References Cited

U.S. PATENT DOCUMENTS 10,177,926 B2 * 1/2019 Barsoba .............. H04L 12/1822
2009/0157709 A1 * 6/2009 Kruger .............. G06F 16/90335
2017/0371496 A1 12/2017 Denoue et al.
2019/0297039 A1 9/2019 Rodriguez et al.
2022/0062770 A1 3/2022 Cappello et al.
2022/0168639 A1 6/2022 Nelson et al.
2024/0325930 A1 * 10/2024 Kestell .................... A63F 13/80
2025/0061141 A1 * 2/2025 Neervannan ........ G06F 16/3344

FOREIGN PATENT DOCUMENTS

CN 105435453 B 2/2019

OTHER PUBLICATIONS

PCT/US2024/049680, "International Search Report and Written Opinion", Jan. 20, 2025, 16 pages.

* cited by examiner

*Primary Examiner* — Andrey Belousov
(74) *Attorney, Agent, or Firm* — Kilpatrick Townsend & Stockton LLP

(57) ABSTRACT

Methods and systems for providing a summary of interactions exchanged between users includes receiving a request for the summary for a time window of gameplay of a video game from a user and, in response, identifying a subset of the interactions generated during the time window. The subset of interactions are analyzed to identify keywords representing topics discussed within and presenting the keywords using visual representation defining a level of prominence assigned to the keywords on a user interface for rendering. Selection of a keyword results in the summary associated with the keyword to be presented to the user.

20 Claims, 7 Drawing Sheets

AI MIDDLEWARE THAT MONITORS COMMUNICATION TO FILTER AND MODIFY LANGUAGE BEING RECEIVED AND TO SUMMARIZE DIALOGUE BETWEEN FRIENDS THAT A PLAYER MISSED WHILE STEPPING AWAY

BACKGROUND OF THE INVENTION

1. Field of the Invention

The present disclosure relates to providing interactions generated during game play of a video game, and more specifically to providing a summary of the interactions exchanged between two or more users during a time window of game play.

2. Description of the Related Art

Video gaming industry has grown in popularity and represents a large percentage of the entertainment market and interactive content generated worldwide. Various types of video games are available for playing. There are single-player video games and multi-player video games. In the case of multi-player video games, the players can play individually against one another or can be part of a team of players playing against at least one other second team. The players of the multi-player video games can be co-located or remotely located from one another. The player(s) select a video game for game play and provide game inputs. The game inputs are used to affect a game state of the video game and to update game data. The updated game data is used to generate game scenes that are returned to client device(s) of the player(s) for rendering. In the case of the multi-player video game, the game inputs of the different players are used to affect the game state and to synchronize the game data returned to the client devices associated with the different players. The game data generated from each game play session of the video game is saved as a video recording and retrieved for subsequent presentation to the one or more players.

In addition to players selecting the video game for game play, one or more spectators may also select the video game to view the game play of one or more players. The one or more spectators may select to follow a particular player or a particular team of players or the game play of the video game as a whole. In response to the request to view the game play of the video game received from the one or more spectators, the game data generated for the video game is shared with the one or more spectators.

During the game play of the video game, the spectators and/or the players may engage in interactions with one another. The interactions may be related to events or activities occurring in the video game, or content presented in the video game, or actions performed by the players, or comments provided by the players or spectators, or may relate to other trending topics or topics of common interest to the players and/or spectators playing/spectating the video game. The spectators and the players are collectively termed as "users". These interactions generated during game play are saved using a timeline associated with the game data.

During game play of a multi-player video game, for example, a user (i.e. a player or a spectator) may temporarily step away from the video game in order to focus on other online or physical activity. While the player or the spectator has stepped away, the game play of the video game and the interactions exchanged between two or more users continue.

When the user returns to either play the video game or spectate the video game, the user may have missed some of the interactions that would have occurred during their absence. The user may wish to be informed on what they missed during their time away from the video game so that they can fully immerse in the video game and/or the interactions.

It is in this context that embodiments of the invention arise.

SUMMARY OF THE INVENTION

Implementations of the present disclosure relate to systems and methods for providing a summary of interactions exchanged between two or more users during a time window of game play of a video game. The interactions can be related to happenings occurring in the video game or can be related to other topics that were discussed during the game play of the video game. A request for a summary of interactions that occurred during game play of the video game may be initiated by a user. The request may specify a time period. The time period may be explicitly selected by a user or can be deduced by the system. The system can, with the user's permission, track the movement of the user in the physical and/or online world and determine a time frame when the user had stepped away from playing or spectating the video game. In response to the request, the system extracts a portion of a recording of the game play of the video game and a portion of interactions exchanged between other users during the specified time period. The portions of the game play and the interactions are used to generate a summary of what the user had missed during their time away from the video game. The summary is returned for rendering at the client device of the user. The summary provides a quick view of what the user missed so that they can quickly immerse in the video game to get a full and enriching game play experience.

The summary may be generated by identifying and highlighting the different topics that were discussed in the interactions, and generating the summary highlighting the topics discussed and brief summary of each topic discussed. The topics of discussion in the interactions may be visually represented to provide the user with a quick view of each topic discussed and a level of prominence each topic garnered in the specified time period the user had stepped away. In some cases, the time period may not always have to correlate with the user stepping away. The time period may be specified by the user to quickly review the topics and summary of each topic discussed and, in some cases, to determine if the topics of discussions correlate with any events or occurrences in the video game. The visual highlights and the summary of the various topics discussed allow the user to quickly get updated on what occurred during their time away from the video game so that when they re-join the video game (either for play or spectate), the user is able to relate to the current interactions and be able to engage in informed participation.

In one implementation, a method to provide a summary of interactions that occurred during game play of a video game, is disclosed. The method includes receiving a request for the summary of interactions exchanged between two or more users during a time window of game play of the video game. The game play generates game data defining game state of the video game and the interactions include conversation strings related to one or more topics discussed during the game play. A subset of the interactions captured during the game play of the video game and correspond to the time window is identified. The subset of the interactions is filtered to retain select ones of the interactions with conversation strings that are relevant to the game play of the video game. The conversation strings included in the select ones of the interactions are analyzed to identify one or more keywords representing topics discussed within. The keywords are presented in a user interface for user selection, wherein the keywords are presented using visual representation defining a level of prominence assigned to each of the keywords. Each keyword, when selected, is configured to provide the summary of the topic associated with the keyword discussed in the conversation strings of the select ones of the interactions exchanged between the two or more users during the time window.

In another implementation, a method to provide a summary of interactions that occurred during a game play of a video game, is disclosed. The method includes receiving a request for the summary of interactions exchanged between two or more users during a time window of game play of the video game. The game play generates game data defining game state of the video game and the interactions include conversation strings related to one or more topics discussed during the game play. A subset of the interactions captured during the game play of the video game and that correspond with the time window is identified. The conversation strings in the subset of the interactions are analyzed to identify one or more topics discussed within, wherein each topic correlates with an event occurring in the video game. The topics identified from the conversation strings are presented in a user interface for user selection. The topics are presented using a visual representation defining a level of prominence assigned to each of the topics identified from the conversation strings included in the subset of interactions. Each topic, when selected at the user interface, is configured to provide the summary of discussion for the topic included in the conversation strings exchanged between the two or more users within the time window.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

The disclosure may be better understood by reference to the following description taken in conjunction with the accompanying drawings.

DETAILED DESCRIPTION

Figure 1:
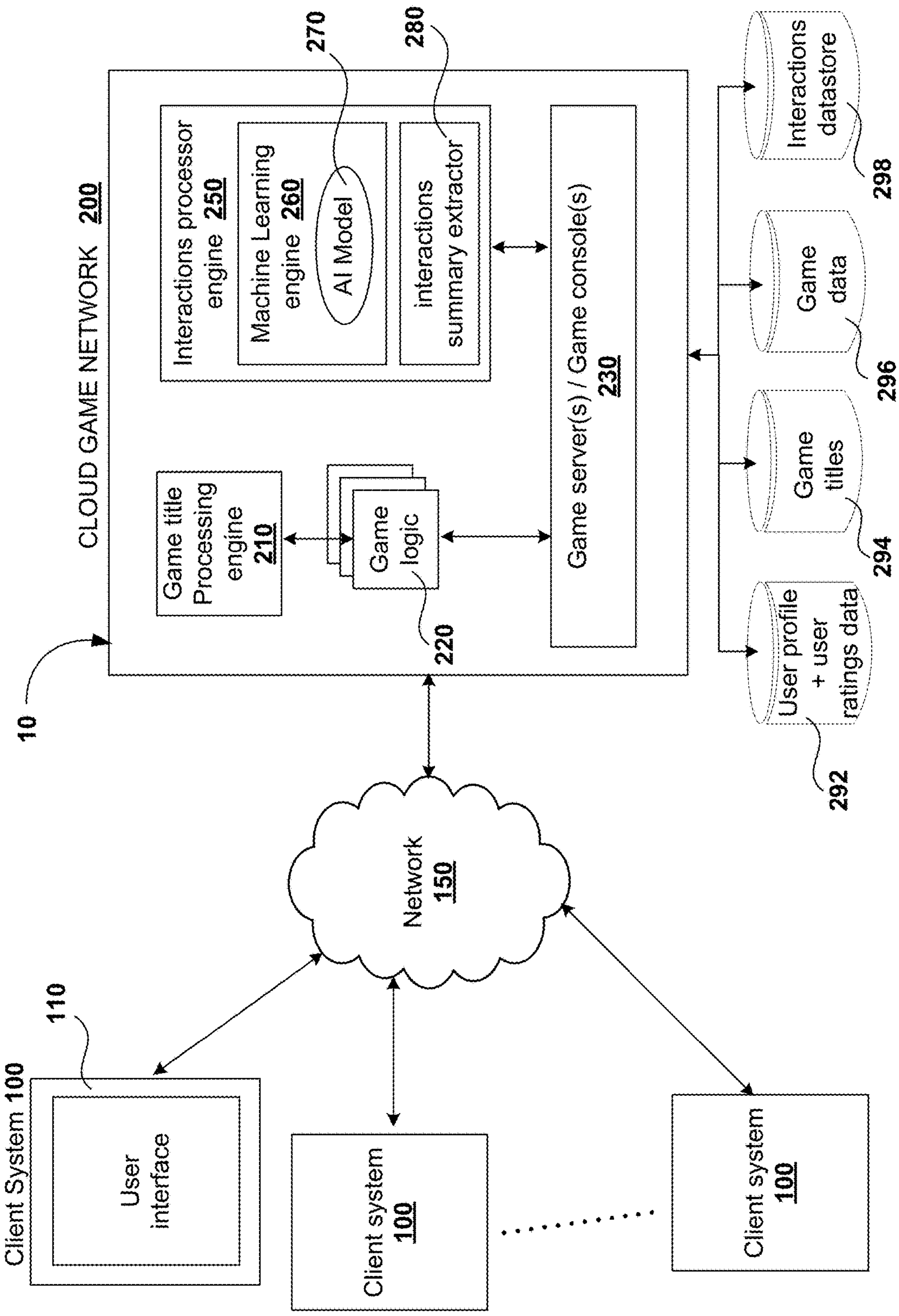
FIG. 1 represents a simplified block diagram of a system that is used to generate a summary of interactions exchanged between two or more users during gameplay of a video game, in accordance with one implementation.

Broadly speaking, implementations of the present disclosure include systems and methods for receiving request from a user for a summary of interactions exchanged between two or more users during game play of a video game and, in response, returning the summary on an interactive user interface for rendering at the client device of a user. The request includes a time window and the interactions for the time window are identified and analyzed to determine topics of discussion. The topics are represented using keywords, wherein each keyword corresponds to a topic. More than one keyword can be used to represent the topic. The keywords representing the topics are used to generate an interactive word cloud. User selection of a keyword from the word cloud is detected and used to present a summary of interaction generated for the topic associated with the keyword. In some implementations, the keywords in the word cloud are visually presented in a manner to show a level of prominence or priority or hierarchy of the topics discussed in the interactions. The level of prominence of a particular topic, for instance, can be determined based on amount of time users spent discussing the particular topic or number of interactions generated for the particular topic, number of users providing the interactions for the particular topic, frequency of interactions discussing the particular topic, etc. In some cases, a histogram of usage of the keywords is generated and used to determine the level of prominence (i.e., importance and percentage of time devoted) of each keyword in the interactions. Based on the level of prominence, the keywords can be stylized and presented at the user interface so as to provide a visual representation of the level of prominence of the keywords. The implementations are not restricted to the use of histograms to determine the level of prominence of the keywords and that other ways of determining the level of prominence of the keywords can also be envisioned.

The interactions generated by users during gameplay of a video game can be in different forms, including verbal interactions, images (e.g., graphics, memes, Graphics Interchange Format files (GIFs), etc.), videos, etc. In some implementations, the verbal interactions can include content used to express ideas, opinions, comments, arguments, etc., exchange information, provide content for discussions for a topic, etc., and can be expressed as text content (i.e., written words expressing ideas, information) and/or audio content (i.e., spoken content, from which words, expressions, emotions, etc., can be deduced). The interactions are transcribed and interpreted using a generative artificial intelligence (GAI) engine, for example, to determine the topics and to summarize the discussions for the topics. In some cases, the GAI engine interprets the interactions by first filtering the interactions to remove non-relevant comments or conversations or threads so that only relevant comments that provide useful and relatable content are retained. In some cases, non-relevant comments can pertain to comments that do not provide any value to any topic or are frivolous comments that do not pertain to any topic. The GAI engine then interprets the retained interactions to identify topics of discussion. In addition to the interactions exchanged between the users, GAI engine also retrieves and interprets game data generated during game play of the video game. When the interactions are game-related, the GAI engine correlates the interactions with the events or activities or actions within the video game using the timeline of the video game. The GAI engine uses the interpreted interactions and, where appropriate, the game content (i.e., interpreted game data) to summarize the interactions. The summary generated for the interactions related to a particular topic is associated with one or more keywords representing the particular topic in the word cloud. When a user interacts with the one or more keywords rendered in the word cloud, the associated summary is presented to the user. The summary provides a brief explanation of the interactions generated for the particular topic and sentiments expressed by the users during the interactions related to the particular topic. In the case where the particular topic is related to events or activities occurring in the game, the summary can also provide details related to the events or activities that were actually happening in the video game during the time the particular topic was being discussed.

A user may step away from the video game and the various implementations discussed herein provide the user with a summary of what the user missed while they were away. The summary allows the user to quickly get up to speed on the interactions exchanged between other users and activities within the video game that the user missed while they were away, so that they can easily immerse in the video game fully informed. This enables the user to have an enriching video game experience.

With the general understanding of the disclosure, specific implementations of the disclosure will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 represents a simplified block diagram of a system 10 having an interactions processor engine 250, which engages artificial intelligence, to summarize interactions exchanged between users during game play of a video game, in accordance with some implementations. The interactions processor engine 250 analyzes the interactions to identify game-related and non-game related interactions, filter the interactions in accordance to language used and subject-matter relevancy, classify the interactions based on topics discussed, sentiments expressed, and type of users providing the interactions. The filtered and classified interactions are then used to generate summary of the interactions. In some implementations, the summary is generated for each topic and in accordance to sentiments expressed within each topic.

The system 10 is shown as a network enabled video gaming system that allows gameplay and spectating of gameplay of a plurality of video games over a network 150 by users associated with one or more client devices 100. Although the system 10 is shown to provide gameplay of video games, the system can also be configured to enable users to interact with other interaction applications as well. The video games can be single-player video games or multi-player video games. In some implementations, a video game can be executed remotely from client devices 100 of users and rendered at the corresponding client devices 100, which can act as thin clients. In alternate implementations, a portion of the video game can be executed on server devices that are located remotely from the client devices 100 of users and another portion of the game can be executed locally at the client device 100 of the users. In yet other implementations, a single-player video game can be executed locally on the local client device 100 of a user and the gameplay of the user accessed over the network 150 of the system 10 by other users who wish to watch (i.e., spectate) the gameplay of the user. In the example illustrated in FIG. 1, the cloud game network 200 is shown to support a multi-player gaming session of a game for a group of users, wherein the support includes providing access to the users for playing as well as spectating, receiving game inputs of users, generating and delivering game data to the users, managing interactions generated by the users (e.g., players and spectators) during game play of the game, and presenting the interactions alongside the game data as well as when specifically requested by the users. The system manages the interactions, so that the users distributed across different geo-locations and participating in the multi-player gaming session, for example, can request details of interactions for any time window of the gaming session and, in response, receive a summary of the interactions generated for the time window. In other implementations, the system 10 supports multiple users participating in a metaverse and provide summary of interactions generated in the metaverse during any time window specified for the gaming session, for user consumption.

In some implementations, the interactions processor engine 250 executing in the cloud game network 200 engages a machine learning engine 260 that uses artificial intelligence (AI) based services to provide the summary of interactions by performing one or more functional features, such as by gathering, analyzing, filtering, classifying and summarizing the various interactions exchanged between two or more users during game play of the game.

Users access the remote services provided by the cloud game network 200 using client devices 100, which include at least a processor (not shown), an input/output (I/O) device/interface and a display screen 110 for presenting content and for providing user input. For example, users may access cloud game network 200 via communications network using corresponding client devices 100. The client devices 100 are configured to provide inputs during gaming session (e.g., game inputs for adjusting game state and interaction inputs when interacting with other users), providing inputs to access, and adjust/update session data of game play session, receiving and presenting streaming media, etc. The client device 100 can be a personal computer (PC), a mobile phone, a personal digital assistant (PDA), handheld device, etc.

In some implementations, when a client device 100 associated with a user is used to access a video game, the client device 100 may be configured with a client-side game title processing engine and game logic (e.g., executable code)

that is stored locally for at least some local processing of the video game application, and for receiving and formatting streaming content as generated by the application executing at a server (e.g., cloud server 230), or for other content provided by server supported at the cloud game network 200.

In another embodiment, client device 100 may be configured as a thin client providing an interface to a back end server 230 within cloud game network 200. The back end server 230 is configured to provide computational functionality for accessing and interacting with the interactive applications (e.g., video games), such as a game title processing engine 210 that is configured to execute game logic 220—i.e., executable code of the video game. In particular, client device 100 of a corresponding user is configured for requesting access to an instance of a particular application, such as a video game, over a communications network, such as the Internet, and for rendering for display images generated from executing the game logic 220 of the video game by the game server 230. The images are encoded (e.g., encoded by a coder-decoder module (CODEC) within the game server 230 or by a separate CODEC) in accordance to communication protocol defined by a communication channel established between the cloud game server 230 and the respective client device 100, and are delivered (i.e., streamed) to the client device 100 for display. In response, the client device 100 is used to provide game inputs (i.e., input commands) that are used to drive the game state of the video game. Client device 100 may receive input from various types of input devices, such as game controllers, tablet computers, keyboards, gestures captured by video cameras, mice, touch pads, audio inputs, input interface, etc.

The game server 230, in response to receiving a request from the client device 100, queries a user profile and user ratings datastore 292 to retrieve the user profile of the user. The user profile data of the user is used to validate the user and to identify the preferences and ratings (i.e., ratings in accordance to skills possessed, content provided, etc.) of the user. The game server 230 also queries a game titles datastore 294 to validate the access request of the user to the video game. Inputs provided by the user at the client device are analyzed to identify game-related inputs and other interaction inputs provided by the user during the game session. The game-related inputs are stored in a game datastore 296 for later retrieval and the interaction inputs are stored in an interactions datastore 298.

In addition, the system 10 includes interactions processor engine 250 equipped with an AI model 270 that is configured to retrieve the interactions generated by the users during a game session from the interactions datastore 298 and perform one or more functions, such as gather, identify, filter, classify, and summarize the different interactions generated by the users during the game session. The interactions can be game-related or can be related to topics that are currently trending or are of common interest to the users that are participating in the game session. When a user requests summary of interactions for a particular time window, an interactions summary extractor 280 within the interactions processor engine 250 is used to identify select ones of the interactions that were generated during the time window of the game session and extract the summary associated with the select ones of the interactions generated using the AI model 270. The extracted summary is returned to the corresponding client device 100 of the user for rendering.

Figure 2:
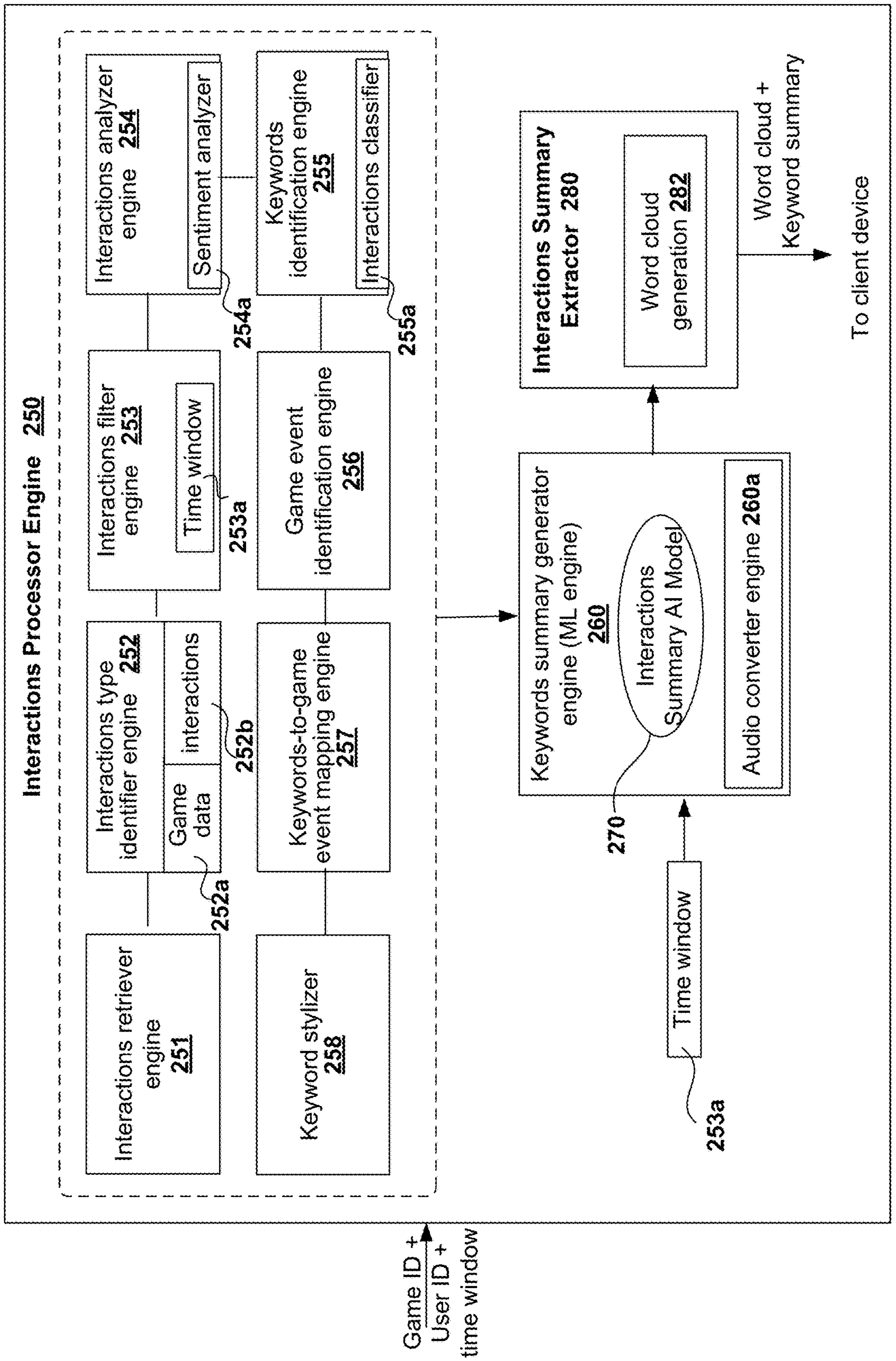
FIG. 2 identifies sub-modules of an interaction processor engine that is used to process the interactions exchanged between two or more users during game play of the video game and to generate summary of the interactions for a specific time period, in accordance with one implementation.
Figure 3:
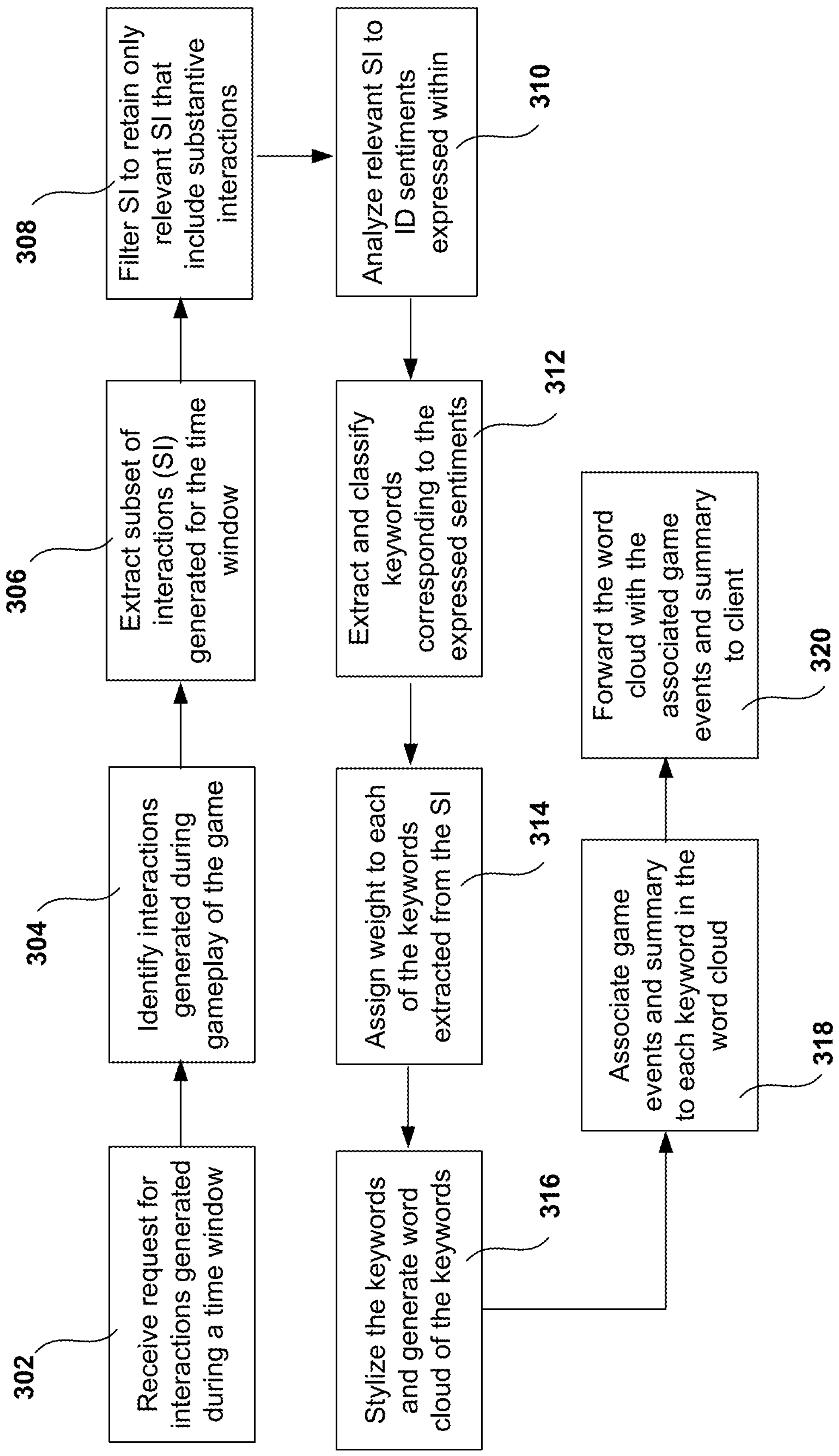
FIG. 3 illustrates a data flow of operations used to generate a summary of interactions for a time window specified by a user and presenting the summary in accordance to topics discussed using keywords used to represent the topics, in accordance with one implementation.

FIG. 2 identifies the various sub-modules of the Interactions Processor Engine 250 that employs a machine learning (ML) engine 260 that generates an AI model 270 to receive, identify and process interactions from the users during a game session of a video game and to summarize the interactions exchanged between the users, in some implementations. In some implementations, the Interactions processor Engine 250 may be a software (i.e., program instructions) stored in memory of a server (e.g., game server 230 or cloud server) and executed by a processor of the server, or may be a firmware. FIG. 3 illustrates an example data flow followed during processing of the interactions generated and/or exchanged between users during a game play session of a video game, in some implementations. Functions of the various sub-modules of the interactions processor engine 250 engaged during processing of the interactions will now be described in detail by referring simultaneously to FIGS. 2 and 3.

The process of generating summary of interactions exchanged between users during gameplay of a video game begins at operation 302, when a request for the summary of the interactions is received at the cloud game network 200, in some implementations. The request could be received at the interactions processor engine 250 executing on the cloud game network 200. The interactions processor engine 250 can be executing on the same server (i.e., cloud game server 230) that executes an instance of game logic 220 of the video game or can be executing on a different server within the cloud game network 200, wherein the different server is communicatively coupled to the cloud game server 230 to exchange details of game data and interactions generated during gameplay of the video game.

During a gameplay session of the video game, a user (either a player or a spectator) of the video game may step away from the video game to attend to other commitments either in the physical world or in the digital world. Upon their return to the video game session, the user may, in some implementations, request for details of interactions exchanged between other users during the gameplay session that the user missed for a period they were away. Depending on the amount of time the user had stepped away from the video game and the frequency and amount of content exchanged in the interactions between the other users, the details can be extensive or few. In order to provide the user with a review of what the user missed when they were away and to allow the user to quickly immerse in the video game and be up-to-date with the interactions, the interactions processor engine 250 may be engaged to provide a summary of the interactions.

In some implementations, the interactions exchanged during a time window of gameplay session may or may not correlate or be associated with events or activities that occurred in the video game. The time window that the user requests can correlate with the time period the user stepped away from the video game or can cover a time period that is greater than or lesser than the time period the user stepped away. A user interface presented at the display screen 110 of the client device 100 is configured to provide one or more options for specifying the time window and for requesting details of select types of the interactions generated during gameplay that corresponds with the time window. The user interface, in some implementations, can be rendered in a portion of the display screen 110 with the other portion of the display screen rendering gameplay data (e.g., game scenes showing the game state).

In some implementations, the options to select the time window can include a timeline with a sliding scale that the user can select to specify a start time and an end time for the time period for which the details are being requested. In addition to the time window, the options can also be used to specify the type of content generated during the time window that the user is interested in receiving. For example, the user may be interested in the interactions exchanged between the users that include game-related content. In another example, the user may be interested in the non-game related interactions exchanged between other users during the time period. In yet another implementation, the user may be interested in both the game-related and non-game-related interactions. For the aforementioned cases, different options may be provided to allow the user to specify the type of interactions the user is interested in receiving. In one implementation, the options can include a first option for receiving only interactions exchanged between the other users corresponding to the time window and a second option for receiving details of only game-related content (i.e., gameplay data providing details of game events or game activities) that occurred during the time window specified for the gameplay session of the game. Additional options can be provided to specify only game-related interactions, non-game-related interactions, game-related and/or non-game-related content that were generated by specific other users or specific group of other users (e.g., other users who were team members of a particular team the user belongs or follows), game-related and/or non-game-related content that were generated during occurrence of specific event(s), etc. The non-game-related content, for instance, can include the interactions between the users that pertain to topics that are currently trending or are of common interest to the users that are participating in the gameplay session of the video game.

In alternate implementations, the interactions processor engine 250 executing on the cloud game network 200 may keep track of the user to determine when the user is focused on gameplay and when the user's attention is away from the video game. The tracking of the user may be done by tracking online activity of the user in the different interactive sessions, which includes the gameplay session, and/or using images of the user captured using one or more image capturing devices associated with the client device and/or are located in the physical environment of the user. The tracking data collected for the user is used by the interactions processor engine 250 to automatically compute a time window when the user is detected to be away from the gameplay session. When the user is detected to have returned to interacting with the gameplay session, the interactions processor engine 250 is configured to automatically present one or more options for validating the time window and for selecting the type of interactions generated by other users during that time period that the user wishes to receive for the time window there were away. For instance, one option can specify the start time and the end time of the time window that the system detected the user being away from the game and allow the user to select the option to validate the time window. In addition to validating the time window, the user may be presented with one or more options to, (a) validate and/or edit the time period for which the user would like the system to provide the details of the interactions that they missed, and (b) the type of interactions that they would like to receive. User validation and/or selection of the specific option(s) is detected by the system and is used as input for the request.

An interactions retriever engine 251 within the interactions processor engine 250 is used to receive as inputs the game identifier and game session identifier of the video game, the time window and, where available, the type of interactions the user would like to receive for the time window. The inputs are used to query the game datastore 296 to retrieve the relevant game data 252*a*, and the interactions datastore 298 to retrieve relevant interactions 252*b* generated for the time window during the gameplay session of the video game (operation 304 of FIG. 3). The game session identifier identifies the current game session and the time window specifies a prior portion of the gameplay in the current game session. Consequently, the request is received and processed in substantial real-time to allow the user to quickly get informed so that they can get fully immersed in the gameplay upon their return. The user requesting the summary can be a player or a spectator.

The relevant game data 252*a* and the interactions 252*b* retrieved from the different datastores (296, 298) are processed using an interactions type identifier engine 252 to identify the types of interactions contained in the retrieved interactions. The game data related to the video game define the game state and provide sufficient details to construct the game scenes representing the game state at different points of time. The interactions generated during the gameplay include comments about the video game, including comments related to game state, the game graphics, the game levels, the game challenges, etc., of the video game, as well as comments about the game inputs provided by the different users, including the specific type of game inputs, the specific sequence of the game inputs, the identity and popularity of the user providing the game inputs, skill level of the user, etc. The interactions also include comments about other users, other users' comments, other users' attributes (e.g., digital or interaction attributes), comments related to certain portion of the video game for which certain ones of the other users provided the inputs, etc. The interactions are provided on a user interface rendered alongside the game content at the client device 100 of the user.

An interactions filter engine 253 is used to identify the game data 252*a* and the different types of interactions 252*b* generated for the game session of the video game. The time window 253*a* specified either by the user or computed by the interactions processor engine 250 is used to identify and retrieve select ones of the interactions and game data corresponding to the time window 253*a* from the different datastores (296, 298) (operation 306 of FIG. 3). The select ones of the interactions are filtered to remove anomalous or inappropriate or irrelevant content. The anomalous content, in some implementations, can relate to an event within the video game that is not of importance or has not garnered sufficient interest from the users (i.e., has garnered one or a negligible number of conversation strings). The inappropriate content, in some implementations, can relate to inappropriate language used in the content of conversation strings generated by one or more users, or content provided by certain ones of the users whose online behavior is known to be aggressive or border on harassment, or content that does not match the discussions of the conversation strings generated during the time window, etc.

The conversation strings, in some cases, are generated in bursts and can sometimes relate to what is occurring in the video game. For example, there can be a burst of conversation strings when a particular event is detected in the video game or a particular action is performed by a user using a specific sequence of inputs or a particular challenge/adversary is overcome or a particular level is achieved, etc. In some cases, the frequency of the burst can resemble a curve, such as a bell-curve, with at least one peak and two troughs, one on either side of the peak. Alternately, the bell-curve can include multiple peaks with troughs encompassing at least some of the peaks. The peak(s) of the bell-curve can correspond to a time period within the time window where the bulk of the conversation strings related to the event of the video game or for a topic that is being discussed are generated, while the portion(s) leading to the trough(s) and away from the peak can include fewer number of conversation strings related to the event or topic or can represent conversation strings that are relevant to other topics. In some implementations, the further the conversation string is from the peak of the bell-curve that corresponds to the event, the less relevant the content of the conversation string can be to the event. In some implementations, the conversation strings that are predominantly directed toward one or more topics are considered for generating the summary. In some implementations, the conversation strings that are considered for generating the summary are those that are generated during the peak of the bell-curve. In other implementations, the conversation strings that are generated for the whole time window is considered for generating the summary.

In some implementations, the conversation string that is away from the peak of the bell-curve can provide useful view or commentary on the event/action/activity that occurred in the video game that the other users overlooked. In order to ensure that relevant content is retained for further processing and the non-relevant content is filtered out, the interactions filter engine 253 uses the context of the content included in the conversation strings of the interactions and the game data pertaining to the time window to identify the content that corresponds to an event or action or activity of the video game or to a subject matter that is being discussed by the users. Based on the determination, the interactions filter engine 253 filters the select ones of the interactions so as to retain only those interactions that is relevant, useful and appropriate (i.e., appropriate language, appropriate behavioral content, etc.) and filter out the content that does not meet the acceptable criteria for the interactions (operation 308 of FIG. 3). In some implementations, the select ones of the interactions that are retained include conversation strings that are predominantly directed toward the one or more topics related to the video game, such as related to the event or activity or action of the video game, or toward a trending topic or topic of common interest to the users. In some other implementations, the select ones of the interactions that are retained are generated during the peak of the burst.

The filtered select ones of the interactions are analyzed using interactions analyzer engine 254. In some implementations, the interactions analyzer engine 254 engages an artificial intelligence (AI) model to perform the analysis. The analysis can include identifying sentiments expressed, and to classify the interactions based on the sentiments and relevancy. A sentiment analyzer 254*a* is used to identify the sentiment expressed in each conversation string (operation 308 of FIG. 3). In some implementations, the sentiment expressed in each conversation string is identified by determining the context of content included in the conversation string, the relationship of association between the different words and the context, other attributes of the content included in the interactions, such as tonality, the intensity, etc. The interactions can be expressed as text, audio, memes, graphics, graphic interchange format files (GIFs), video, etc. The various formats of interactions are first interpreted, wherein the interpretation includes capturing various attributes of the interactions. For example, the audio content can be interpreted to identify the text and other attributes of the spoken content, such as tonality, intensity, volume, speed, etc., the text content can be interpreted to identify certain words (e.g., keywords), frequency of usage of the certain words, etc. Similarly, images, memes and GIFs can be interpreted to identify the expressions or messages that are being conveyed. These attributes are captured in addition to the text content and are analyzed to determine the sentiments expressed by the users (operation 310 of FIG. 3).

Details of the attributes captured and the sentiments expressed in the conversation strings are provided as inputs to a keywords identification engine 255. The keywords identification engine 255 identifies keywords included in the interactions that correspond with one or more topics discussed within, wherein the topics can be game-related (i.e., corresponds with an event or action or activity within the game) or non-game-related (i.e., non-game-related topics that are trending or are popular with the users). The keywords that correspond with the topics may also be weighted in accordance to the popularity of the topics amongst the users, the frequency of the keywords related to the topics used in the different conversation strings, number of users generating the conversation strings in which the keywords associated with the topics are used, etc. The keywords identification engine 255 also identifies the keywords that were used to express the sentiments by the interactions analyzer engine 254. In some implementations, the keywords are characterized in accordance to the sentiments expressed. Each sentiment expressed is assigned a weight based on number of conversation strings in which the sentiment is expressed, the number of users expressing or providing supporting comment for the sentiment, etc. The keywords identified in each conversation string (topic-related and sentiment-related) are then classified using an interactions classifier 255*a*, wherein the classification is done in accordance to the weight assigned to the keywords or weight assigned to the sentiment expressed by the keywords. As with the sentiment analyzer 254*a*, the AI model used by the sentiment analyzer 254*a* can also be used by the interactions classifier 255*a* of the keywords identification engine 255 to use the assigned weights for the different keywords identified in each conversation string to classify the topics associated with the keywords (operations 312 and 314 of FIG. 3). The weight assigned to the sentiment or to the keywords identified in the conversation strings define the relevance of the conversation strings for consideration in generating the summary for the topic of discussion.

The keywords identified by the keywords identification engine 255 are used by a game event identification engine 256 to determine if one or more of the keywords identified in the conversation strings correlate with one or more game events or actions or activities that occurred in the video game during the time period when the conversation strings with the keywords were generated. As noted, some of the keywords may be game-related while other keywords may be non-game-related. The game event identification engine 256 is used to identify such keywords and correlate the identified keywords to an event or action or activity of the video game. The correlation can be done using timeline of the video game and the timestamp of the conversation string.

Once a keyword identified in the conversation string is correlated to an event or action or activity of the video game associated with is identified, a keywords-to-game event mapping engine 257 is used to map the topic associated with the keyword to the identified event/action/activity of the video game. The mapping may be done using the timeline of the video game and stored in the interactions datastore 298. In the event where the keywords are not associated with an event or action or activity of the video game, the topics associated with the keywords are identified and the keywords, the topics associated with the keywords and the weights assigned to the keywords are all stored in the interactions datastore 298.

A keyword stylizer 258 is used to stylize the keywords identified from the conversation strings (operation 316 of FIG. 3). The stylization of each keyword can be done to visually represent a level of prominence that is accorded to each topic represented by the keyword within the interactions exchanged between the users during gameplay of the video game. The level of prominence of each keyword, in some implementations, is determined based on the weights assigned to each keyword. In other implementations, the level of prominence of a keyword is defined as a function of percentage of time spent in discussing the topic associated with the keyword, number of interactions discussion the topic of the keyword, and number of users participating in the interactions discussing the keyword. Additionally, in some other implementations, the prominence function can also include a number of portions of the video game where the topic of the keyword is discussed. In some implementations, the keywords are stylized in accordance to the sentiments expressed by or associated with the keywords or in the conversation strings in which the keywords are used. In some implementations, the keywords may be stylized by color-coding, italicizing, flashing, underlining using varying thickness, bolding, sizing, or any other form that can be used to visually distinguish the level of prominence accorded to the different keywords.

As a response to the request received from the user for details of the interactions generated by other users in a time window of gameplay of the video game, a keywords summary generator engine 260 is used to extract the keywords identified from the select ones of the interactions generated during the time window. The select ones of the interactions are the ones that were identified by the different sub-modules of the interactions processor engine 250 for the time window 253*a*, classified, the keywords identified, mapped and stylized. As previously noted, the select ones of the interactions can include content that are game-related or non-game-related or both. The keywords summary generator engine 260, in some implementations, is a generative AI engine that develops and trains an AI model, such as interactions summary AI model 270, to use the keywords identified in the select ones of the interactions and to use the content included in the select ones of the interactions to generate the summary of the conversations. In some implementations, the summary generated for the keyword or the topic associated with the keyword is customized for the user requesting the summary. For example, the summary may be requested by a player or by a spectator. Based on the type of user requesting the summary, the summary may be customized for the user. For instance, when a player requests the summary, the content included in the interactions may be sorted to prioritize game-related content higher than the non-game-related content and the summary is generated to include the game-related content first followed by the non-game-related content. In some implementations where one or more of the identified keywords correspond with game-related topic, the summary generated for such keywords include details of an event or action or activity of the video game that were discussed in the select ones of the interactions. The generated summary and the associated game event/action/activity are mapped with the corresponding keyword, so that when the keyword is selected by the user at the word cloud, the user is provided with the summary, which includes the details of the event/action/activity of the video game. The generated summary provides a brief review of the conversations included in the select ones of the interactions so as to allow the user to get a quick update of the various actions, events, activities, topics of conversations included in the conversation strings generated during the time window specified by the user.

The summary, in some implementations, is generated in text format. In some other implementations, the summary generated for each keyword is also converted into audio format using an audio converter engine 260*a*. The audio version of the summary is also associated with the respective keywords along with the text summary. The generated summary is stored with the corresponding keywords in the interactions datastore 298. Based on the preference of the user requesting the summary, either the audio format or the text format of the summary is retrieved and provided.

An interactions summary extractor 280 is engaged to extract the relevant summary associated with the keywords identified from the select ones of the interactions. In some implementations, based on the requesting user's preference either the audio version or the text version of the summary is extracted for the identified keywords. A word cloud generation engine 282 within the interactions summary extractor 280 is used to dynamically generate a word cloud with the keywords identified for the time window 253*a*. The word cloud is generated as an interactive word cloud, wherein each keyword can be selected to receive the summary of the interactions and, where available, details of the game event/action/activity of the video game associated with it (operation 318 of FIG. 3). Further, each keyword in the word cloud is stylized in accordance to the style defined by the keyword stylizer 258 so as to provide a visual representation of a level of prominence associated with the keyword. In one example implementation, the keywords may be stylized using a size attribute, wherein each size is defined to correspond with a certain level of prominence, with the largest size corresponding to highest level of prominence (i.e., keyword corresponding to a highly popular topic) and the smallest size corresponding to a lowest level of prominence (i.e., keyword corresponding a less popular topic). In addition to or instead of the size attribute, the word cloud generation engine 282 can use other rendering attributes to provide a distinguishable visual representation. The word cloud with the keywords and the associated summary is returned to the client device of the user for rendering on a user interface presented on the display screen 110 (operation 320 of FIG. 3).

When the user selects a keyword from the word cloud, the summary associated with the keyword is rendered at the user interface, wherein the user interface can be a display screen (for rendering the text component of the summary) or a speaker (for rendering the audio component of the summary).

Instead of providing the word cloud with the keywords and rendering the associated summary when a keyword from the word cloud is selected, the interactions summary extractor 280 can, in some implementations, retrieve the summary of the interactions generated for the time window 253*a* and forward it to the client device 100 for rendering at the user interface. As noted, the summary can be rendered in text format on the display screen 110 of the client device 100 of the user or in audio format via the speaker associated with the client device 100 of the user. In these implementations, the step of generating the word cloud is bypassed.

Figure 4:
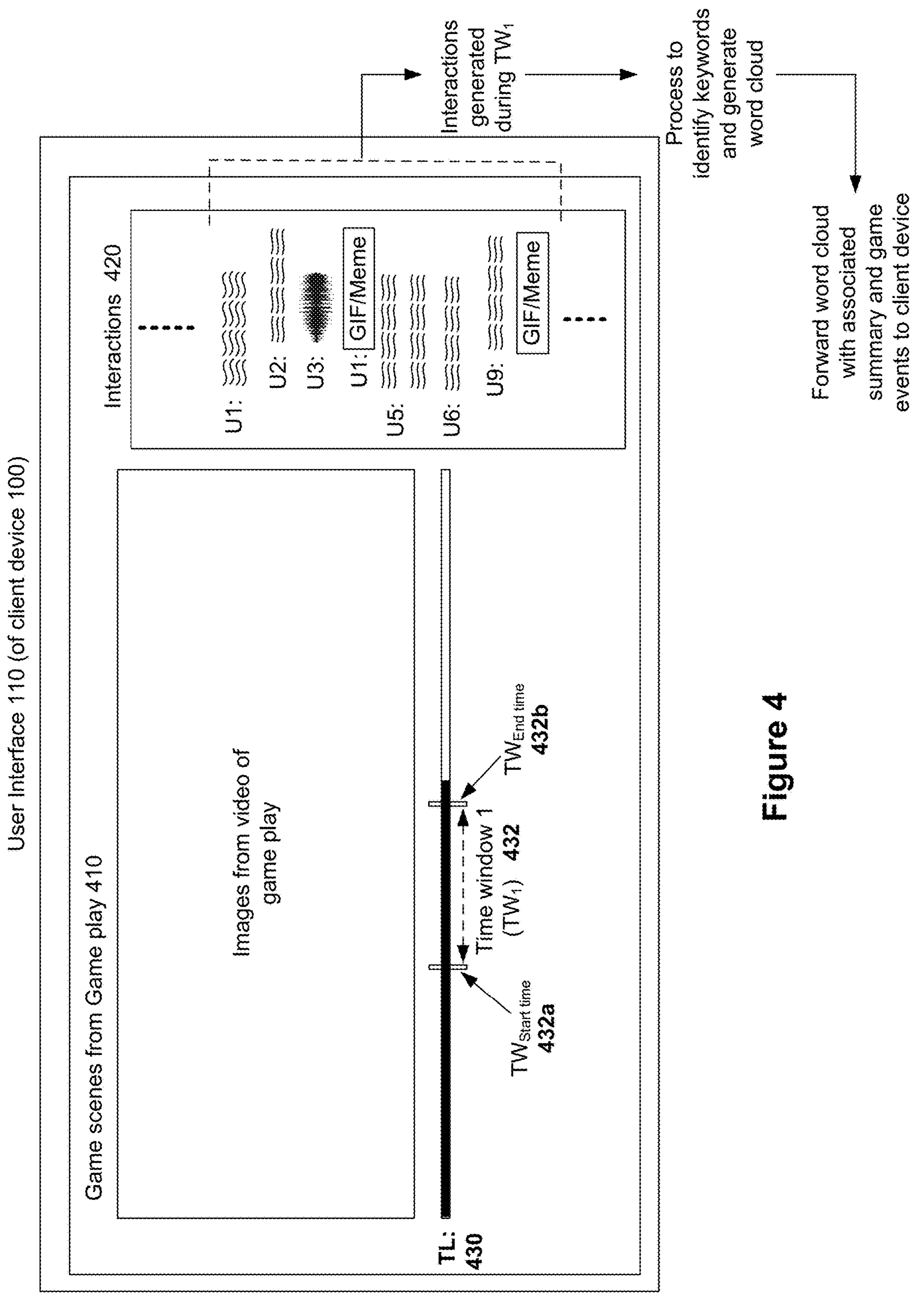
FIG. 4 illustrates an example user interface used to select a time window for requesting summary of interactions captured during game play of the video game, in accordance with one implementation.

FIG. 4 illustrates a user interface rendered on a display screen 110 of a client device 100 of a user that is used for rendering content of an interactive application, for providing inputs, including inputs to influence the gameplay of the video game and comments related to gameplay or other users or other topics, and for receiving and rendering comments from the user and the other users participating in the gameplay of the video game, in some implementations. A first portion of the user interface is used for rendering the game scenes of the video game and a timeline TL 430 associated with the gameplay of the video game that is currently being played. The dark portion of the timeline TL 430 shows how far the gameplay has advanced. A second portion of the user interface is used for rendering the comments (i.e., interactions 420) received during gameplay of the video game. As shown, the interactions can be in any format, including text, audio, GIFs/Memes, images, videos, graphics, etc.

During gameplay of the video game, the user may step away from the video game for a period of time and upon their return, may want to be apprised of what occurred within the video game and what was exchanged between the different users (e.g., players, spectators or both players and spectators) of the video game. The user can select a time window $TW_1$ 432 using the timeline TL 430 to request the details of what they missed during their time away from the gameplay of the video game. The user can define the time window $TW_1$ 432 by selecting by a start time $TW_{start\text{-}time}$ 432*a* and an end time $TW_{end\text{-}time}$ 432*b* from the timeline TL 430. Depending on the popularity of the video game and/or the users playing the video game, and/or the frequency of postings generated by the different users (e.g., spectators, players, etc.), the interactions exchanged between users can be extensive or limited.

The request from the user is to get quickly apprised on what occurred (game-related and conversation-related) during their time away from the video game so that the user is better equipped to follow the interactions and the gameplay of the video game that occur subsequent to their return. The interactions processor engine 250 identifies the interactions that was generated during the time window $TW_1$ 432 and provides a summary of the interactions, which can include details related to the game events/actions/activities that occurred during the time window $TW_1$ 432. The summary can be provided compactly in a word cloud using keywords that were identified from the interactions or can be provided in text or audio format.

Figure 5:
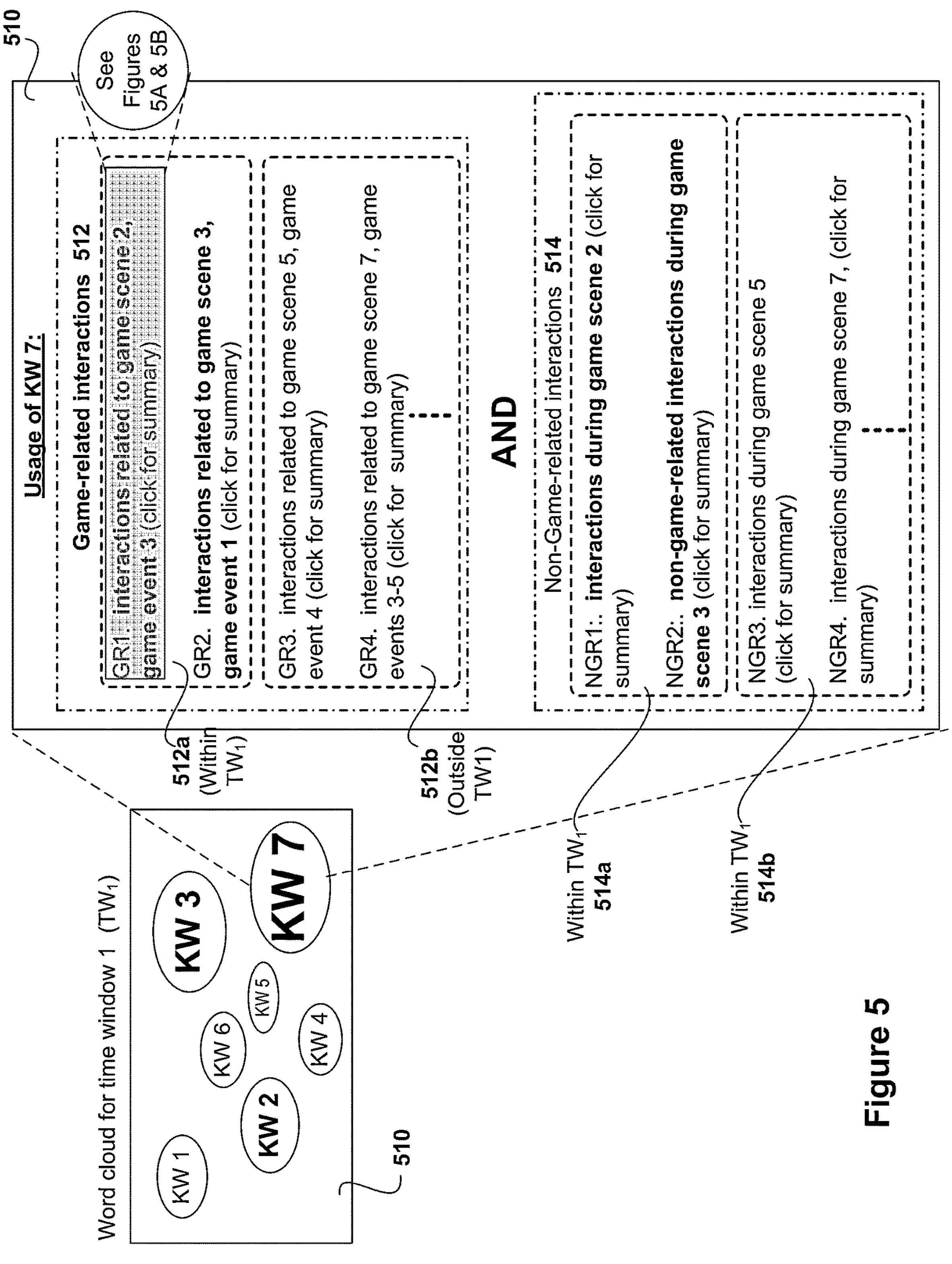
FIG. 5 illustrates an example interactive word cloud generated with keywords representing topics discussed in the interactions between users during time window, and the conversation strings identified for the time window, in accordance with one implementation.

FIG. 5 illustrates a sample word cloud 510 generated for the time window $TW_1$ 432 specified by the user, in some implementations. The word cloud 510 includes a plurality of keywords (KW 1-KW 7) identified from the interactions exchanged between users and represented as word-bubbles. The word cloud 510 is generated with the keywords KW 1-KW 7 stylized to provide a visually distinguishable representation of the level of prominence of the keywords in the interactions, wherein the stylizing includes adjusting one or more rendering attributes associated with the keywords. In the example word cloud 510 illustrated in FIG. 5, a size attribute has been used to visually distinguish the prominence level of the keywords, with keyword KW 7 being shown to have the largest size indicating that the topic associated with keyword KW 7 appeared in greater number of conversation strings, and keyword KW 5 being shown to have the smallest size indicating that the topic associated with keyword KW 5 appeared in fewer number of conversation strings. FIG. 5 shows the number of interactions that include keyword KW 7 or the topic associated with the keyword KW 7. The keyword KW 7 or the topic related to keyword KW 7 is shown to be included in game-related interactions 512 and non-game-related interactions 514. In reality, the keyword KW 7 can be included in just game-related interactions or just non-game-related interactions. Further, in FIG. 5, the list of conversation strings that includes keyword KW 7 or the topic related to keyword KW 7 is shown to be included in game-related conversation strings that are within (512*a*) as well as outside (512*b*) of the time window $TW_1$. Similarly, keyword KW 7 or the topic related to keyword KW 7 is shown to be included in non-game-related conversation strings that are within (514*a*) as well as outside (514*b*) of the time window $TW_1$.

Figure 5A:
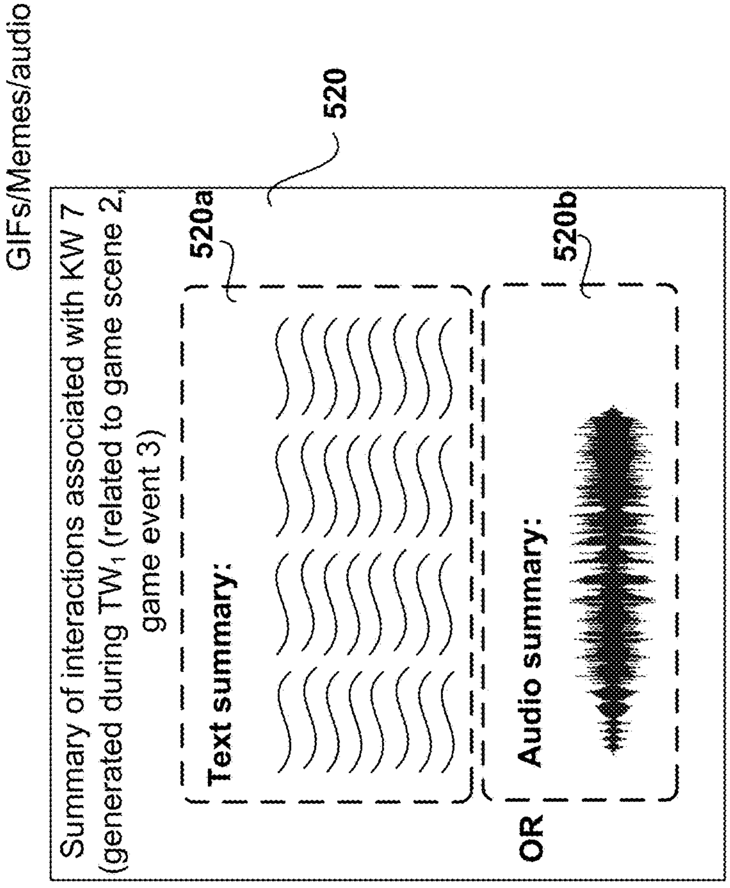
FIG. 5A illustrates an example summary of interactions corresponding to the topic associated with a keyword presented in the word cloud of FIG. 5, in accordance with one implementation.

User selection of the keyword KW 7 (as shown by the greyed-out circle representing KW 7) in the word cloud 510 will result in the summary associated with the keyword KW 7 to be rendered on the user interface at a display screen 110 at the client device 100 of the user. Depending on the keyword KW 7 being used in game-related and/or non-game-related conversation strings, the corresponding summary of the interactions is dynamically generated and rendered at the user interface. FIG. 5A illustrates one such implementation, wherein the summary of the conversation strings for keyword KW 7 is rendered either in text format 520*a* or audio format 520*b*, depending on the user preference on the format.

Figure 5B:
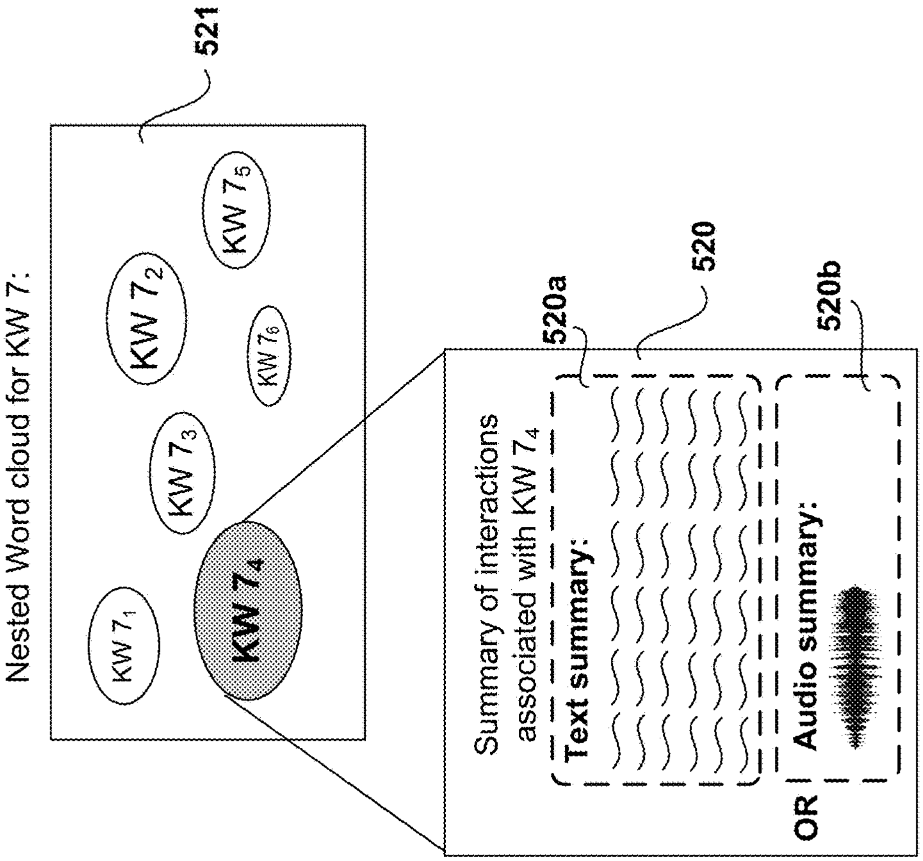
FIG. 5B illustrates an example interactive nested word cloud generated for a keyword presented in the word cloud of FIG. 5, with each keyword in the nested word cloud providing a summary of discussions generated for a topic associated with the keyword, in accordance with one implementation.

In some implementation, one or more keywords included in the word cloud 510 can include nested word cloud. FIG. 5B illustrates one such implementation, wherein keyword KW 7 is shown to include a second word cloud 521 nested within with additional keywords KW $7_1$-KW $7_6$ included as word-bubbles. When the user selects keyword KW $7_4$ (shown by the greyed-out circle) from the second word cloud 521, summary 520 pertaining to the keyword KW $7_4$ is provided on the user interface in text format 520*a* or audio format 520*b*. In some implementations, instead of nested word cloud 521, the summary presented for the interactions or the summary presented for a keyword selected from the word cloud 510 there can be nested summary, wherein the summary and the nested summary can be in text format and/or in audio format.

To summarize, the various implementations allow a user to specify a time window and request summary of conversations/interactions generated during the time window of gameplay of the video game. An interactions processor engine is configured to receive the request, extract the portion of interactions generated for the time period defining the time window, filter the content to remove inappropriate language and content that does not add any value to the discussions related to topics in the conversation strings or to what is occurring in the video game, and interpret the various formats of comments/content included in the conversation strings. The filtering is done contextually to ensure that conversations or comments of value to the user or related to the happenings in the video game are not filtered out. The filtered interactions are then summarized using a generative AI engine, which uses the transcript to generate brief of the discussions. The summary can be generated for each distinct topic or for each distinct sentiment. The summary can also be customized for each user based on the type of user requesting the summary and the preference of the user, wherein the user preference can specify that they would like to receive only players' interactions, only spectators' interactions, or event-related interactions, etc. The summary can be provided using a word cloud with word-bubbles in the form of keywords representing the various topics discussed, or can be provided in textual format or audio format. Each keyword identified for inclusion in the word cloud is identified by analyzing usage of the keyword to determine importance of a topic and percentage of time devoted to the topic represented by the keyword and are stylized accordingly to provide visual representation of the level of prominence of the keyword in the conversation strings. The analysis can be done using a histogram or using other forms of analysis. The keywords in the word cloud can include nested keywords or the summary of the interactions can include nested summaries. The summary allows the user to get fully informed about what has occurred during the time window so that the user can knowingly dive and fully immerse in the video game.

Figure 6:
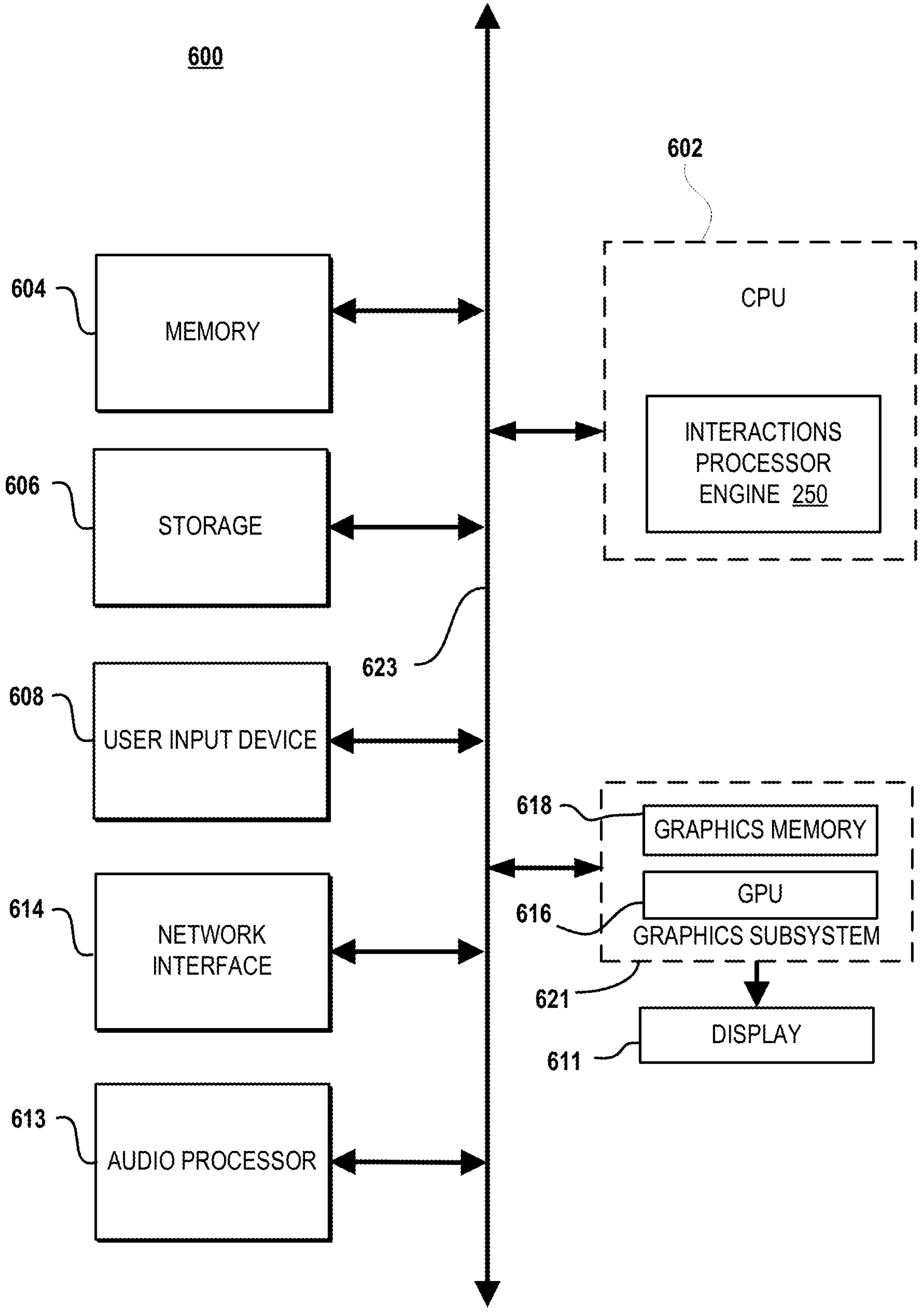
FIG. 6 illustrates components of an example system that can be used to process requests from a user, provide content and assistance to the user to perform aspects of the various implementations of the present disclosure.

FIG. 6 illustrates components of an example device 600 (e.g., server device 230 of FIG. 1) that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 613 is adapted to generate analog or digital audio output from instructions and/or data provided by the CPU 602, memory 604, and/or storage 606. The components of device 600, including CPU 602, memory 604, data storage 606, user input devices 608, network interface 614, and audio processor 613 are connected via one or more data buses 623.

A graphics subsystem 621 is further connected with data bus 623 and the components of the device 600. The graphics subsystem 621 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 621 periodically outputs pixel data for an image from graphics memory 618 to be displayed on display device 611. Display device 611 can be any device capable of displaying visual information in response to a signal from the device 600, including CRT, LCD, plasma, and OLED displays. Device 600 can provide the display device 611 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction. During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method, comprising:

receiving a request for a summary of interactions exchanged between two or more users during a time window of game play of a video game, the game play generating game data defining game state of the video game and the interactions include conversation strings related to one or more topics discussed during the game play;

identifying a subset of the interactions captured during the game play of the video game that correspond with the time window;

filtering the subset of the interactions based on context of the conversation strings and the game data for the time window to retain select ones of the interactions that correspond to an event, action, or activity of the video game or to subject matter discussed by the users;

analyzing the conversation strings included in the select ones of the interactions to identify keywords representing topics discussed within and to correlate a keyword of the identified keywords with a portion of the game data based on a timeline of the video game and a time stamp of a conversation string that includes the keyword; and presenting the keywords in a user interface for user selection, the keywords presented using visual representation defining a level of prominence assigned to each of the keywords, wherein a keyword, when selected at the user interface, is configured to provide a summary of a topic associated with the keyword that includes one or more details of the event, action, or activity correlated with the keyword.

2. The method of claim 1, wherein presenting the keywords using visual representation includes stylizing each keyword of the identified keywords presented in the user interface by adjusting one or more rendering attributes of said keyword, the stylizing performed to distinctly represent the level of prominence assigned to said keyword when rendered at the user interface.

3. The method of claim 2, wherein stylizing each keyword of the identified keywords includes any one or a combination of bolding, italicizing, color-coding, sizing, flashing and frequency of flashing, and underlining, wherein an amount of stylizing done to said each keyword is done in accordance to the level of prominence assigned to said each keyword, the amount of stylizing performed to provide visually distinguishable representation of said each keyword.

4. The method of claim 1, wherein the level of prominence of each keyword of the identified keywords is determined by analyzing the conversation strings of the interactions captured during game play using a generative AI engine, the level of prominence determined as a function of any one or combination of a percentage of time spent in discussing a topic associated with said each keyword, a number of interactions discussing said topic, a number of users participating in the interactions discussing said topic and a number of portions of the video game where said topic associated with said each keyword is discussed.

5. The method of claim 4, wherein the summary of the topic identifies each portion of the number of portions of the video game where the topic mapped to said each keyword is discussed.

6. The method of claim 1, wherein the summary of the topic is customized and presented in accordance to a type of user requesting the summary of interactions.

7. The method of claim 1, wherein the filtering of the subset includes, detecting a burst of the conversation strings generated during the time window, a frequency of the burst of the conversation strings represented by a curve defined by at least a peak and two troughs encompassing the peak; and filtering the conversation strings included in the burst, so as to retain the conversation strings including discussions that are predominantly directed toward one or more topics.

8. The method of claim 7, wherein the conversation strings that are retained are generated during the peak of the burst.

9. The method of claim 7, wherein a topic of the one or more topics is related to an event occurring in the video game, and the conversation strings that are retained include discussions on the topic related to the event.

10. The method of claim 7, wherein the conversation strings that are retained include discussions related to a topic of the one or more topics, wherein the topic is not related to the video game.

11. The method of claim 1, wherein the subset of the interactions is filtered to remove one or more interactions with language that are deemed inappropriate for presenting to the two or more users or include content that do not add value to discussions on any one of the topics included in the conversation strings.

12. The method of claim 1, wherein the keywords are visually represented in a word cloud with each keyword of the identified keywords presented as an interactive word-bubble, each word-bubble, when selected, is configured to render a summary of the conversation strings related to a topic associated with the keyword represented by the selected interactive word-bubble.

13. The method of claim 12, wherein presenting the summary of the conversation strings further includes, identifying one or more sentiments expressed in the conversation strings related to the topic associated with the keyword of the word-bubble; and presenting the summary of the conversation strings separately for each sentiment expressed, at the user interface.

14. The method of claim 12, wherein the word cloud includes at least one nested word-bubble, and wherein, when the nested word-bubble is selected, presenting the summary of the conversation strings includes presenting a second word cloud with a second set of keywords represented as a second set of interactive word-bubbles, each interactive word-bubble in the second set providing the summary of the conversation strings related to the topic associated with a corresponding keyword of the interactive word-bubble of the second set.

15. The method of claim 1, wherein the summary of the topic is presented by, identifying the keywords defining each topic discussed in the interactions exchanged between the two or more users during the time window;

characterizing the keywords in accordance to sentiments expressed in the interactions discussing said each topic associated with the keywords, wherein each sentiment of the expressed sentiments is assigned a weight based on a number of conversation strings in which said each sentiment is expressed; and classifying the conversation strings associated with the keywords by assigning a weight to said each sentiment expressed in the interactions, weights of the expressed sentiments used to determine relevance of the conversation strings for inclusion in presenting the summary of the topic, the summary of the topic presented distinctly for said each sentiment expressed in the interactions.

16. A method, comprising:

receiving a request for a summary of interactions exchanged between two or more users during a time window of game play of a video game, the game play generating game data defining game state of the video game and the interactions include conversation strings related to one or more topics discussed during the game play;

identifying a subset of the interactions captured during the game play of the video game that correspond with the time window;

analyzing the conversation strings included in the subset of the interactions to identify one or more topics discussed within, each of the one or more topics correlated with an event occurring in the video game based on a timeline of the video game and a time stamp of a conversation string that corresponds to the topic; and presenting the topics in a user interface for user selection, the topics presented using visual representation defining a level of prominence assigned to each topic of the one or more topics identified from the conversation strings, wherein each topic, when selected, is configured to provide a summary of discussions for said topic included in the conversation strings exchanged between the two or more users in the time window, the summary of discussions including one or more details of the correlated event.

17. The method of claim 16, further includes, filtering the subset of the interactions to retain select ones of the interactions from the subset of the interactions with language used in the conversation strings that is in accordance to a type and preferences of each user defined in a user profile of a respective one of the two or more users, the select ones of the interactions used in analyzing the conversation strings to identify the one or more topics, wherein each topic of the one or more topics is presented on the user interface using one or more keywords representing said each topic, and wherein the interactions are received as anyone or a combination of a text, an image, an audio, a video, graphics, memes, and graphic interchange format file, and wherein the interactions are interpreted to identify the one or more topics discussed in the conversation strings.

18. The method of claim 1, wherein filtering includes detecting a burst of the conversation strings generated during the time window, a frequency of the burst including a curve with a peak and two troughs encompassing the peak, and retaining conversation strings generated during the peak.

19. The method of claim 1, wherein the keywords are presented in a word cloud that includes a nested word bubble, and wherein selection of the nested word bubble causes presentation of a second word cloud with a second set of keywords, each keyword of the second set providing a summary for a respective topic associated with the selected nested word bubble.

20. The method of claim 1, further comprising identifying sentiments expressed in the conversation strings related to a selected keyword, assigning a weight to each sentiment based on a number of conversation strings in which the sentiment is expressed, and presenting separate summaries for respective sentiments.

* * * * *